C. MACBETH.
MANUFACTURE OF TIRES.
APPLICATION FILED JULY 1, 1919.
1,343,460.
Patented June 15, 1920.
3 SHEETS—SHEET 1.
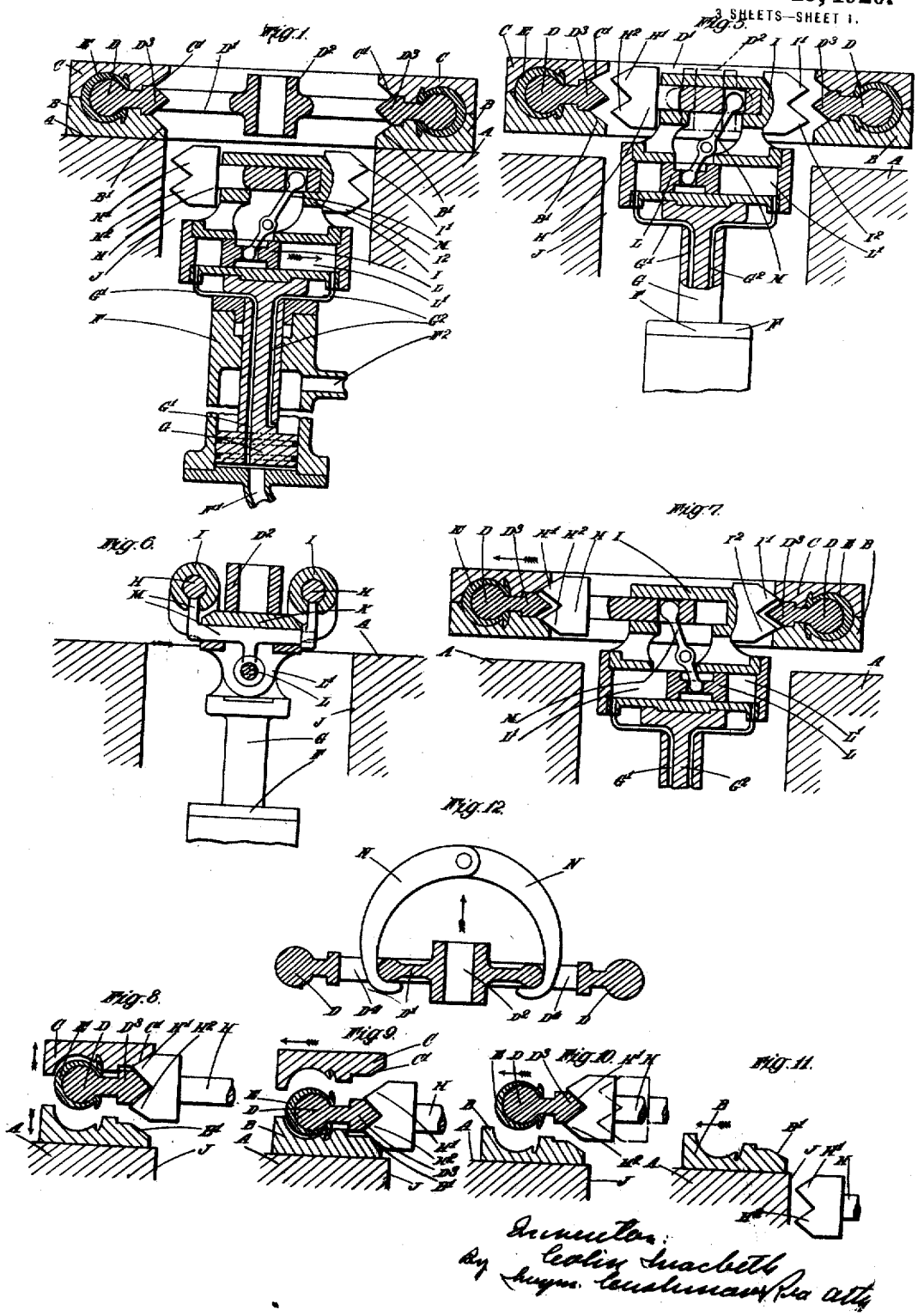

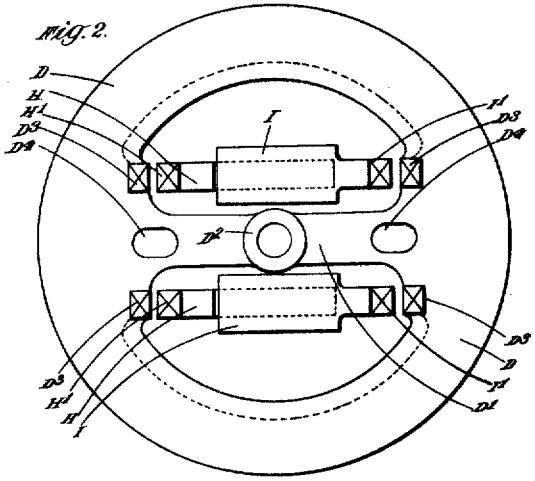
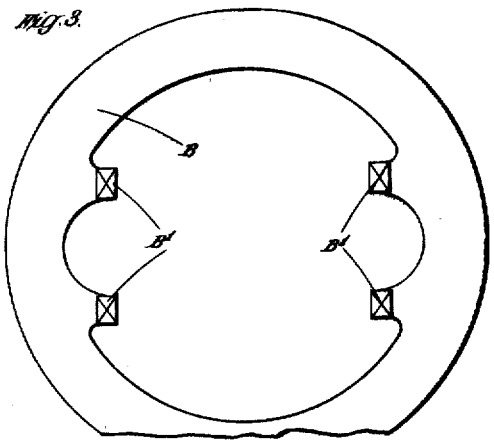
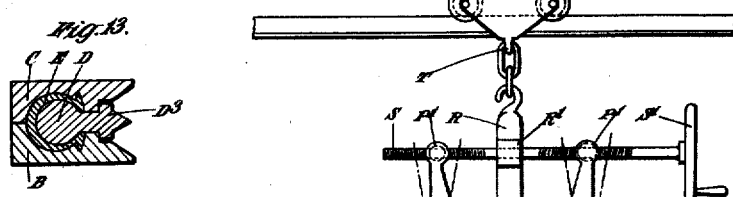
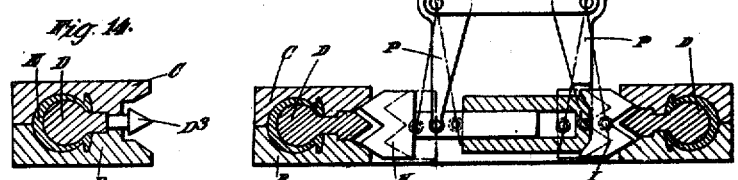

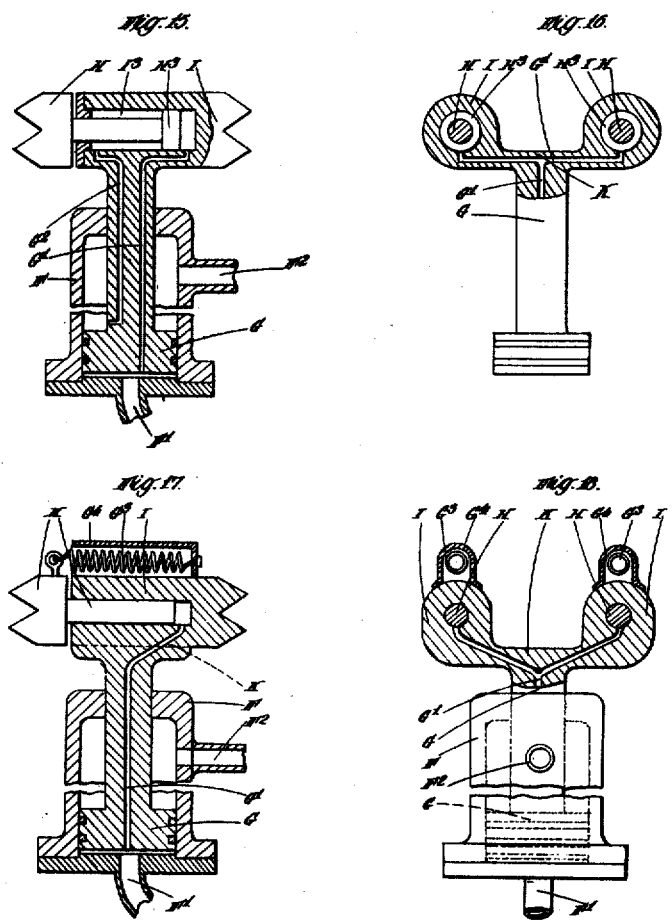

UNITED STATES PATENT OFFICE.

COLIN MACBETH, OF BIRMINGHAM, ENGLAND, ASSIGNOR TO THE DUNLOP RUBBER COMPANY, LIMITED, OF WESTMINSTER, ENGLAND.

MANUFACTURE OF TIRES.

1,343,460.   Specification of Letters Patent.   Patented June 15, 1920.

Application filed July 1, 1919. Serial No. 307,917.

*To all whom it may concern:*

Be it known that I, COLIN MACBETH, a subject of the King of Great Britain, residing at Para Mills, Aston Cross, Birmingham, in the county of Warwick, England, have invented certain new and useful Improvements in or Relating to the Manufacture of Tires, of which the following is a specification.

This invention relates particularly to the manufacture of tires and has reference to the opening of molds containing tires, although the invention is applicable to the opening of similar circular molds for other articles. The invention is especially intended for opening the molds for pneumatic tire covers which are supported in the molds on suitable supports or cores, but it is also applicable in the case of molds for solid or cushion tires which are mounted on suitable bases or other supports. For convenience of description the term tire will be used when necessary as including a pneumatic tire cover or a solid or cushion tire. Usually the mold comprises two parts or shells embracing the tire and core, and these parts are opened and separated from the tire and core by levers or bars which are forced by hand between the lugs or suitable parts on the mold shells, to pry them apart. Such methods are unsatisfactory in that much heavy work is involved and moreover the mold shells and also the tires are likely to be damaged unless great care is exercised in manipulating the levers or bars. The chief object of the present invention is to expedite and facilitate the opening of the molds and the separation thereof from the tire and core in such a manner that the likelihood of the mold shells and the tire being damaged, is minimized.

According to this invention the closed mold and the core or other support for the tire are adapted to be manipulated or engaged by means, so constructed and adapted to operate as to uniformly move or separate the mold shells and to retain the core or support carrying the tire, out of contact with the mold shells after the opening or separation of the mold shells has been effected. The mold shells and the core are carried away to the required places after the opening and separation have been effected, the various operations being expeditiously effected in proper sequence and in such manner that manual labor is reduced to a minimum. For the purpose of this invention, the two mold shells are formed with suitable parts which in conjunction with suitable parts on the tire core or support form beveled surface notches or the like with which are adapted to engage members having beveled inclined or similar parts in such a manner that the said members (hereinafter termed the "mold openers") force the mold shells apart and engage with or grip the core to retain it out of contact with the mold shells after the latter have been separated. The mold openers may preferably form part of or be mounted on a hydraulic ram or other elevating device so as to be raised into a suitably supported mold ready to engage with and open the mold shells which latter operation may be effected by hydraulic or other appropriate means. If desired, however, the mold openers may be mounted on any suitable form of supporting or suspending device for enabling them to be placed into the mold and they may be moved to effect the opening of the mold shells and engagement with the tire core by hand operated mechanism such as levers actuated by right and left hand screw threads.

In order that the said invention may be clearly understood and readily carried into effect, the same will be described more fully with reference to the accompanying diagrammatic drawings, in which:—

Figure 1 represents a vertical sectional view of one construction of the hydraulically operated apparatus devised for opening molds containing pneumatic tire covers.

Fig. 2 is a plan of the apparatus shown in Fig. 1 with the upper mold shell removed.

Figs. 3 and 4 are respectively a plan and a part sectional view of the lower mold shell.

Fig. 5 is a similar view to Fig. 1 showing the mold and the mold openers in position just prior to the mold openers being moved to engage with the mold shells.

Fig. 6 is an end view partly in section showing the apparatus in the position illustrated in Fig. 5.

Fig. 7 illustrates the mold openers in engagement with the mold shells just prior to opening the same.

Figs. 8, 9, 10 and 11 are diagrams illustrating the various positions of the mold shells, tire core and the mold openers during the actual opening and separating operations.

Fig. 12 shows the tire core after separation from the mold shells supported by suitable grabs or lifting hooks for enabling it to be removed as required.

Figs. 13 and 14 illustrate modifications of the tire core hereinafter referred to.

Figs. 15 and 16 are respectively a sectional side view and a part sectional end view of a modified construction of the hydraulically operated apparatus.

Figs. 17 and 18 are respectively a sectional side view and a sectional end view illustrating a further modification of the hydraulically operated apparatus.

Fig. 19 illustrates one construction of apparatus in which the mold openers are actuated by hand operated means.

A represents a horizontal table or support upon which the mold comprising a lower part B and an upper part C is supported. D represents the core having a pneumatic tire cover E thereon and clamped between the lower and upper mold shells B and C. F is a hydraulic cylinder containing a ram G the upper part of which carries the mold openers H and I which are normally disposed in an opening J formed in the mold supporting table A, see Figs. 1 and 2. As shown in Figs. 1 and 2, the core D is formed or provided with a diametrical part D' at the center of which is a hub $D^2$. On each side of the diametrical part D' the core is provided with beveled surfaces arranged to form a pair of oppositely disposed V-shaped projections $D^3$ on each side of the part D' as shown more particularly in Figs. 1 and 2. The lower mold shell B is provided with a pair of oppositely disposed inclined or beveled surfaces B' on each side of the diametrical line which coincides with the diametrical line passing through the part D' of the tire core, see Fig. 3. The upper mold C is provided with similarly arranged beveled surfaces C' and the beveled surfaces B' and C' of the mold shells B and C constitute in conjunction with the V-shaped projections $D^3$ on the tire core, V-shaped notches as shown in Fig. 1. Two pairs of mold openers are provided, one pair H, I, on each side of the diametrical part D' of the core as shown in Fig. 2, the mold opener H of each pair being in the form of a horizontally movable plunger fitting within a cylinder forming the other mold opener I. On the outer ends of each mold opener, two V-shaped projections H', $H^2$ or I', $I^2$ are provided which as hereinafter described, are adapted to engage with the beveled surfaces B', C' of the mold shells and the V-shaped projections $D^3$ of the tire core. The closed mold with the tire held therein on the core is placed on the table A with its center approximately coincident with the center of the opening H. The ram G carrying the mold openers H, I at its upper part is adapted to be raised by admitting hydraulic pressure to the lower part of the cylinder F through the opening F'. During the upward movement of the ram G, low hydraulic pressure is admitted to the cylinder F above the ram G through the pipe $F^2$; consequently low hydraulic pressure is admitted through the pipe $G^2$ to one end of a cylinder L', carried on the ram head, which cylinder as shown contains a piston or plunger L connected to the mold openers H and I by a centrally pivoted lever M which according to the example shown has two arms for engaging with the mold openers H, H, see Fig. 6. The low hydraulic pressure acting on one end of the plunger L therefore maintains the mold openers H, H in contracted or collapsed position during the upward stroke of the ram G see Fig. 1. The two pairs of mold openers H, I, in being raised become disposed on each side of the core hub $D^2$ as shown in Figs. 2 and 6 and eventually a plate or part K of the ram head comes into contact with the hub $D^2$ and thus raises or lifts the complete mold out of contact with the table or support A, which position is illustrated in Fig. 5. This operation enables the V-shaped projections on the mold openers to be alined with the aforesaid V-shaped recesses formed between the V-shaped projections $D^3$ on the core and the beveled surfaces B', C' on the mold shells. When the ram G reaches the limit of its upward movement, the hydraulic pressure below the same increases and eventually becomes sufficient to act on the plunger L through the pipe G' and thus overcome the pressure retaining the plunger in the inoperative position shown in Fig. 1, so as to move the plunger in the direction of the arrow shown in Fig. 1. The movement of the plunger in this direction rocks the pivoted lever M engaging therewith and with the mold openers H, H see Fig. 6 so that the latter are moved outwardly. During the upward movement of the ram the hydraulic pressure below the same is not sufficient to prematurely cause the plunger to move the mold openers outwardly, and as stated above this operation is not effected until the ram has reached the limit of its upward movement.

Two cylinders such as L may be used one for each mold opener H, modifications of such arrangements being hereinafter described which, however, dispenses with the rocking levers M although such may be used with two cylinders. Owing to the mold openers H being moved outwardly the two V-shaped projections H' and H² enter the V-shaped recesses between the core and mold shells and come into contact with the adjacent beveled surfaces B', C' on the mold shells. The outward movement of the mold openers H causes the complete mold to be displaced horizontally until the V-shaped recesses at the opposite side of the mold are engaged or entered by the V-shaped projections I', I² on the mold openers I so that the latter projections engage or make contact with the adjacent beveled surfaces on the mold shells; this position of the mold is illustrated in Fig. 7. The continued outward movement of the mold openers H results in the V-shaped projections on all the mold openers being wedged into the said V-shaped recesses with the result that the outer beveled surfaces of the said V-shaped projections bear hard against the beveled surfaces B', C' of the mold shells and thus wedge or force the shells B and C apart so that the lower shell B falls or drops on to the table A while the upper mold shell is maintained in a raised position on the mold openers; this position being illustrated in Fig. 8. At the moment the separation of the mold shells is effected the V-shaped recess between each pair of V-shaped projections H', H² or I', I² engages the adjacent V-shaped projection D³ on the core with the result that the core is retained in a horizontal position on the mold openers H, I with the separated mold shells out of contact therewith as shown in Fig. 8. The ram G is then slightly lowered so that the mold openers and core supported thereby permit of the upper mold shell being moved or carried away preferably in a horizontal or lateral direction as indicated by the arrow in Fig. 9. This movement or carrying away of the upper mold shell may be effected by means of a grab suspended from an overhead runway, the grab having pendant hooks which can be readily attached to two or more lugs on the outer circumferential part of the mold shell. The ram is then slightly raised, see Fig. 10 to enable grabs or lifting hooks N to be fitted into holes D⁴ in the core (see Figs. 2 and 12). The mold openers H are then moved inwardly by increasing the fluid pressure to the cylinder L through the passage G² in the ram and a supply pipe F² thereby releasing the core and leaving it suspended on the hooks N so that it can be lifted or moved away as required. The ram is then lowered to bring the mold openers below the table A by relieving the hydraulic pressure below the vertical ram so that it moves downwardly under the influence of gravity or by low hydraulic pressure above the ram if desired. Thus the lower mold shell on the table is free to be moved away horizontally in the direction of the arrow as shown in Fig. 11 to leave the apparatus ready for another complete mold with the tire and core therein to be placed in the position shown in Fig. 1 ready to be opened in the manner above set forth. The method and apparatus above described is especially suitable in cases where a considerable number of molds are placed in one vulcanizing press so that they can be successfully removed from the press and supplied on to the table or support A ready to be opened and moved away in quick succession as above set forth.

Figs. 13 and 14 show slight modifications of the section of the tire core, Fig. 13 showing the outside "bung" type and Fig. 14 the inside "bung" type.

In the modification shown in Figs. 15 and 16 the cylinder L', the plunger L and the lever M which is connected to the plunger and the mold opener H are dispensed with. In this case each mold opener H is formed at its inner end with a piston or plunger H³ contained within a cylinder I³ formed in each of the other mold openers I which latter are carried by or form part of the ram G. The ram G is provided with passages G' and G² leading to the two ends of each cylinder I³. High pressure water is admitted through the pipe F' to raise the ram and through the passages G' to cause the outward movement of the pistons H³ and the mold openers H. The return movement of the mold openers H is effected by admitting low pressure water through the opening F² and the passages G² to the other side of the pistons H³ and the low pressure water also effects the downward movement of the ram when the pressure below the same is relieved. In the modification shown in Figs. 17 and 18 a somewhat similar arrangement to that shown in Figs. 16 and 17 is provided but in this case the mold openers H are moved in one direction by hydraulic pressure through passages G' in the ram, the return movement being effected by means of springs G³ connected to the mold openers I and to the mold openers H, which springs are covered or shielded by a hood or protector G⁴. In this case the lowering of the ram may be effected by the action of gravity when the pressure below the same is relieved. In the example shown in Fig. 19 each set of mold openers H and I may be carried at the lower ends of levers P which are centrally pivoted to two arms of a bracket or support R suspended from an overhead runway T. The upper ends of the levers P are provided with oppositely screw threaded nuts P' through which pass a shaft S having oppositely cut screw threads and supported in a suitable bearing R' on the aforesaid support, the shaft also having a hand wheel S' by means of which it can be rotated to effect angular movement of the levers and the consequent inward or outward movement of the mold openers H and I. The support R may be arranged to have a vertical movement so as to lower the mold openers into the mold or to raise the same therefrom or with the mold as required.

What I claim and desire to secure by Letters Patent of the United States is:—

1. Apparatus for opening tire and similar molds comprising means adapted to positively effect separation of the mold shells from the core and support the latter and the tire out of contact with said shells independent of any movement of the core.

2. Apparatus for opening tire and similar molds, comprising a plurality of wedge-shaped mold opening members adapted to be moved to wedge the mold shells apart and to support the tire core or the like of contact with the separated mold shells.

3. Apparatus for opening tire and similar molds, comprising mold opening members each formed with a pair of V-shaped projections so disposed as to provide a notch between them, and means for moving the said mold opening members so that the said V-shaped projections thereon engage the mold shells to separate or open the latter while the said V-shaped recesses engage with the tire core or the like.

4. Apparatus for opening tire and similar molds, comprising a mold support, and mold opening members adapted to be moved into a mold on said support and then to be moved to engage with and open the mold and to retain the tire core or the like out of contact with the separated mold shells.

5. Apparatus for opening tire and similar molds, comprising a horizontal mold support, a vertically movable device carrying wedge shaped mold opening members and adapted to be moved vertically to position the mold opening members within the space inclosed by the mold, and means for causing the mold opening members to be brought into engagement with the mold shells so as to force or wedge them apart, substantially as described.

6. Apparatus for opening tire and similar molds, comprising a horizontal mold support, a vertically movable device, mold opening members carried thereby, the said device being adapted to raise a complete mold from the support and to bring the mold supporting members within the space inclosed by the mold, means for causing said members to engage with and separate the mold shells so that the lower shell falls on to the mold support while the other shell is retained on the said members which are also adapted to retain the core out of contact with the separated mold shells.

7. Apparatus for opening tire and similar molds, comprising a horizontal support for a mold which contains a tire core or the like provided with a diametrical part, a vertically movable device carrying two pairs of mold opening members and adapted to have said diametrical part of the core rest thereon between the two pairs of mold opening members so that it can be raised from the mold support, and means carried by said device for causing the mold opening members to engage with the shells and tire core of a mold on said device, substantially as and for the purpose specified.

8. Apparatus for opening tire and similar molds, comprising a hydraulic ram carrying mold opening members and a cylinder which contains a plunger connected to or associated with the mold opening members, the ram being adapted to be moved to raise a mold from a horizontal supporting table, and fluid pressure means for actuating the aforesaid plunger and mold opening members to cause the latter to engage with and separate the mold shells and to grip the tire core therein, substantially as and for the purpose specified.

9. Apparatus for opening tire and similar molds comprising a hydraulic ram carrying mold opening members, and means for effecting relative movement between said members for the purpose specified.

10. A method of opening tire and similar molds in which the mold is raised from a suitable support and pressure applied thereto for causing the mold shells to be separated so that the lower one drops or falls on to the mold support while the upper one is retained out of contact with the tire core, the upper mold, the core and the lower mold shell then being successively removed substantially as and for the purpose specified.

11. Apparatus for opening tire and similar molds, comprising a device carrying pivoted levers which are connected at one end to mold opening members while at the other end they are adapted to be moved toward or away from each other by suitable means substantially as and for the purpose set forth.

12. An apparatus for opening tire and similar molds comprising a support for a mold, and means movable axially into the space surrounded by the mold on said support and provided with radially adjustable elements adapted to separate the shells of the mold from the core thereof.

13. An apparatus for opening tire and similar molds including a core and two separable shells, the latter having portions forming an annular channel about the space surrounded by the mold, comprising means movable axially into said space and provided with elements adapted to engage the core through said channel, and means for moving said elements radially of the mold to separate the shells thereof while in engagement with the core.

14. An apparatus for opening tire and similar molds comprising members adapted to engage, respectively, the core and one of the mold shells of such a mold, and means for effecting relative movement between said shell and core in the direction of the axis of the mold.

15. An apparatus for opening tire and similar molds comprising means adapted to engage the inner periphery of the core and simultaneously exert pressure on the mold shells to separate them from the core.

16. An apparatus for opening tire and similar molds comprising means movable to and from the space surrounded by a mold and including members movable radially of the mold to engage the inner periphery of the core and having beveled surfaces that exert pressure on the mold shells during such radial movement, whereby the core and mold shells will be relatively displaced axially.

17. An apparatus for opening tire and similar molds, comprising means adapted to positively exert pressure in opposite directions upon the mold shells, on lines substantially parallel to the axis of the core, to separate the shells from the core independent of any movement of the latter.

18. An appaartus for opening tire and similar molds, comprising means adapted to positively exert pressure in opposite directions upon the mold shells, on lines substantially parallel to the axis of the core, to separate the shells from the core, independent of any movement of the latter, and to support the core and tire out of contact with said shells.

19. An apparatus for opening tire and similar molds, comprising a horizontal mold support, and a vertically movable device adapted to be positioned within the space inclosed by the mold and provided with radially projecting movable means for positively engaging the mold sections and moving them in opposite directions from the core.

COLIN MACBETH.